United States Patent [19]

Smiley

[11] Patent Number: 5,050,770
[45] Date of Patent: Sep. 24, 1991

[54] METHOD AND APPARATUS FOR DELIVERING PARTICULATE MATERIAL

[76] Inventor: Gordon D. Smiley, Rte. 4, Box 245, Greensburg, Ind. 47240

[21] Appl. No.: 392,600

[22] Filed: Aug. 11, 1989

[51] Int. Cl.⁵ .............................................. B67D 5/00
[52] U.S. Cl. ...................................... 222/1; 222/64; 222/491; 222/556; 177/114
[58] Field of Search ................... 222/64, 77, 556, 491, 222/58, 1, 62, 63, 504; 406/32, 33, 23, 26; 177/114; 239/689

[56] References Cited

U.S. PATENT DOCUMENTS

| | | | |
|---|---|---|---|
| 3,423,130 | 1/1969 | Milner | 302/14 |
| 3,490,419 | 1/1970 | Van Huis | 119/53 |
| 3,539,223 | 11/1970 | Bovagne | 406/32 |
| 3,799,622 | 3/1974 | Hek | 406/23 |
| 4,082,064 | 4/1978 | Newell, III | 119/51.11 |
| 4,105,462 | 8/1978 | Thanos | 106/218 |
| 4,172,535 | 10/1979 | Smith | 406/23 |
| 4,337,728 | 7/1982 | Van Gilst et al. | 119/51 R |
| 4,363,291 | 12/1982 | Harmsen | 119/51 R |
| 4,527,714 | 7/1985 | Bowman | 222/64 |
| 4,580,698 | 4/1986 | Ladt et al. | 222/504 |
| 4,927,312 | 5/1990 | Meredith et al. | 222/504 X |
| 4,944,428 | 7/1990 | Gmür et al. | 222/77 X |

Primary Examiner—Michael S. Huppert
Assistant Examiner—Anthoula Pomrening
Attorney, Agent, or Firm—Wood, Herron & Evans

[57] ABSTRACT

A method and apparatus are disclosed for delivering particulate material while minimizing the release of dust. The apparatus comprises a vertical conduit, and movable flap adapted to close the lower end of the conduit and a counterweight or linear actuator for moving the flap to close the conduit whenever the quantity of material within the conduit drops to be predetermined level. The device operates so that a column of solid particulate material is maintained in the lower end of the tube at all times to prevent escape of dust.

15 Claims, 3 Drawing Sheets

METHOD AND APPARATUS FOR DELIVERING PARTICULATE MATERIAL

BACKGROUND OF THE INVENTION

The present invention relates to a method and apparatus for delivering particulate materials while minimizing the escape of dust. The invention has utility in many fields, but has particular utility in connection with systems for delivering animal feed to feeders adapted to deposit feed in feeder troughs or pans.

At the present time, there are many systems in which particulate material such as feed, grain or the like is delivered to a receptacle forming part of a utilization device such as an animal feeder or to a transport receptacle, e.g., a barge. In many such systems the delivery of material is automated with the material being intermittently conveyed through elevated feed tubes to a plurality of vertical tubes which direct it to individual utilization devices.

One persistent problem with such systems has been the release of substantial amounts of dust into the atmosphere. This dust has been found to be deleterious to both the health of the human workers and, in the case of animal feeders, to the livestock being fed. One approach which has been taken to the solution of this problem in the animal feeding field is the addition of tallow or soybean oil to the feed. It has been found, for example, that 2.5% of added fat results in a 21% dust reduction, while 5% added fat reduces dust levels 49.1%. The use of fat at the lower 2.5% level results in an added cost of $4.50 per hog. On a percentage basis, this increases the producers cost by nearly 7%.

SUMMARY OF THE PRESENT INVENTION

The present invention is predicated upon the concept of reducing the amount of dust liberated during the delivery of particulate material without the addition of fat, oil or other chemicals. In accordance with the present invention, a substantial portion of the dust is entrapped within the delivery system by mechanical means.

More particularly, one particularly advantageous form of a particulate material delivery system utilizing the present invention is adapted to provide animal feed to a plurality of individual feeders. The system includes an elevated horizontal feed pipe containing an auger or other device for transporting particulate material. A plurality of vertical tubes depend from this horizontal feed tube with the lower ends of the vertical tubes discharging into the feeders. In accordance with the present invention, a particulate material delivery device is mounted at the lower end of each of the vertical tubes. This device comprises a flap which can be pivoted between a first position in which it closes the vertical tube and a second position in which it is spaced from the vertical tube permitting discharge of material therefrom. A means is provided for normally holding the flap in the closed position until a quantity of particulate material is accumulated in the lower portion of the vertical tube which exceeds a predetermined amount. This accumulated particulate material forms a buffer column, for example, a foot high, which is effective to inhibit escape of any substantial amount of dust into the atmosphere.

As more material is delivered to the vertical tube so that the level rises above a preselected minimum amount, the flap is opened permitting material to be discharged from the tube. However, as soon as the amount of material in the tube falls again below a predetermined minimum, the flap is again closed. Thus, at all times, there remains with the lower end of the tube a column of particulate material which seals off the interior of the tube from atmosphere and prevents the escape of any substantial amount of dust.

The lower end of the tube is preferably arranged relatively close the receptacle into which the particulate material is to be fed, for example, within a foot or so of such re ptacle. Thus, there is only a minimum drop of material from the feed tube and no substantial amount of dust is generated when the material falls into the receptacle.

In accordance with the principles of the present invention, one construction for automatically operating the closure flap involves the provision of a counterweight affixed to a pivoted flap. The counterweight normally pivots the flap into the closed position and permits the flap to open only when the quantity of material accumulated in the vertical tube exceeds a predetermined amount. As soon as sufficient material is discharged from the tube to drop the amount below the predetermined limit, the counterweight again closes the tube so, that at all times, a column of particulate material is maintained within the tube which is effective to prevent escape of dust.

It is a further concept of the present invention to provide a supply device involving a reciprocating inner tube mounted within an outer tube. The reciprocating tube is interconnected to the flap by means of a suitable rod or the like. I have determined that the use of such an inner tube provides improved reliability of operation of the device. More particularly, in a device in which no such inner tube is provided but rather the operation of the flap depends solely upon the weight of the material pressing against the flap, such operation is erratic, i.e., the flap does not always open when the level of material within the vertical tube reaches a predetermined amount. I have determined that the reason for this is that the particulate material exerts an outward frictional force against the walls of the conduit so that the force of the material directed downwardly against the bottom closure plate does not always accurately correspond to the amount of material accumulated. However, when an inner tube is utilized, the weight of the material acting against the inner tube is effectively transferred to the rod to the closure flap, and the counterweight is thus effective to reliably close the flap when the level of material drops below a predetermined amount and is effective to open the flap when the level of material exceeds this amount. I have found that the provision of a vertical rod within the tube provides the further advantage that it tends to break up the particulate material when the inner tube is shifted.

In a modified embodiment of a delivery device embodying the present invention, the flap is interconnected with a linear actuator which drives the flap to either a closed or open position depending upon the level of material within the vertical tube. This level is sensed by two sensors, for example, capacitive sensors, vertically spaced within the tube. The lower sensor corresponds to a lower limit of material and is effective to produce a signal causing the flap to be driven to its closed position whenever the level of material in the tube reaches the lower sensor. The upper sensor is effective to produce a signal when the level of material reaches that sensor to cause the flap to be shifted to its open position.

One advantage of the present particulate material supply devices and their method of operation is that they minimize the release of dust into the atmosphere. Another advantage of the present method and apparatus is that they greatly reduce the separation of particles. Such separation occurs in prior art delivery devices as a result of the free falling of the particles through a vertical tube in such a manner that the materials acquire a considerable velocity. For example, in a typical prior art animal feed delivery system the particles may fall six to ten feet from a horizontal feed tube into individual feeders. In contrast, in the present system the materials initially fall into a cushion of particulate material, for example, one to two feet in depth which is maintained in the bottom of the vertical tube. When the material is discharged from this tube, it drops only a short distance into the receptacle of the utilization device so that it has a very small velocity and minimal air turbulence so that separation is minimized.

A still further advantage of the present invention is that the delivery system minimizes the breakage of the material itself. For example, when grain is being loaded into a barge the grain falls a substantial distance within a vertical tube, and then falls directly into the barge. Throughout the course of its vertical travel, the grain is increasing in velocity. As a result, the grain is susceptible to material damage due to impact when the moving grain contacts the stationary grain in the barge. Additionally, an appreciable amount of turbulence is created when the grain leaves the delivery tube and enters the open space above the grain accumulated in the barge. This turbulence adds to the separation of the grain and creates a large amount of dust.

These and other objects and advantages of the present invention will be more readily understood from the following detailed description of the drawings illustrating a preferred embodiment of the invention. In the drawings:

DETAILED DESCRIPTION OF A PREFERRED EMBODIMENT

Figure 1:
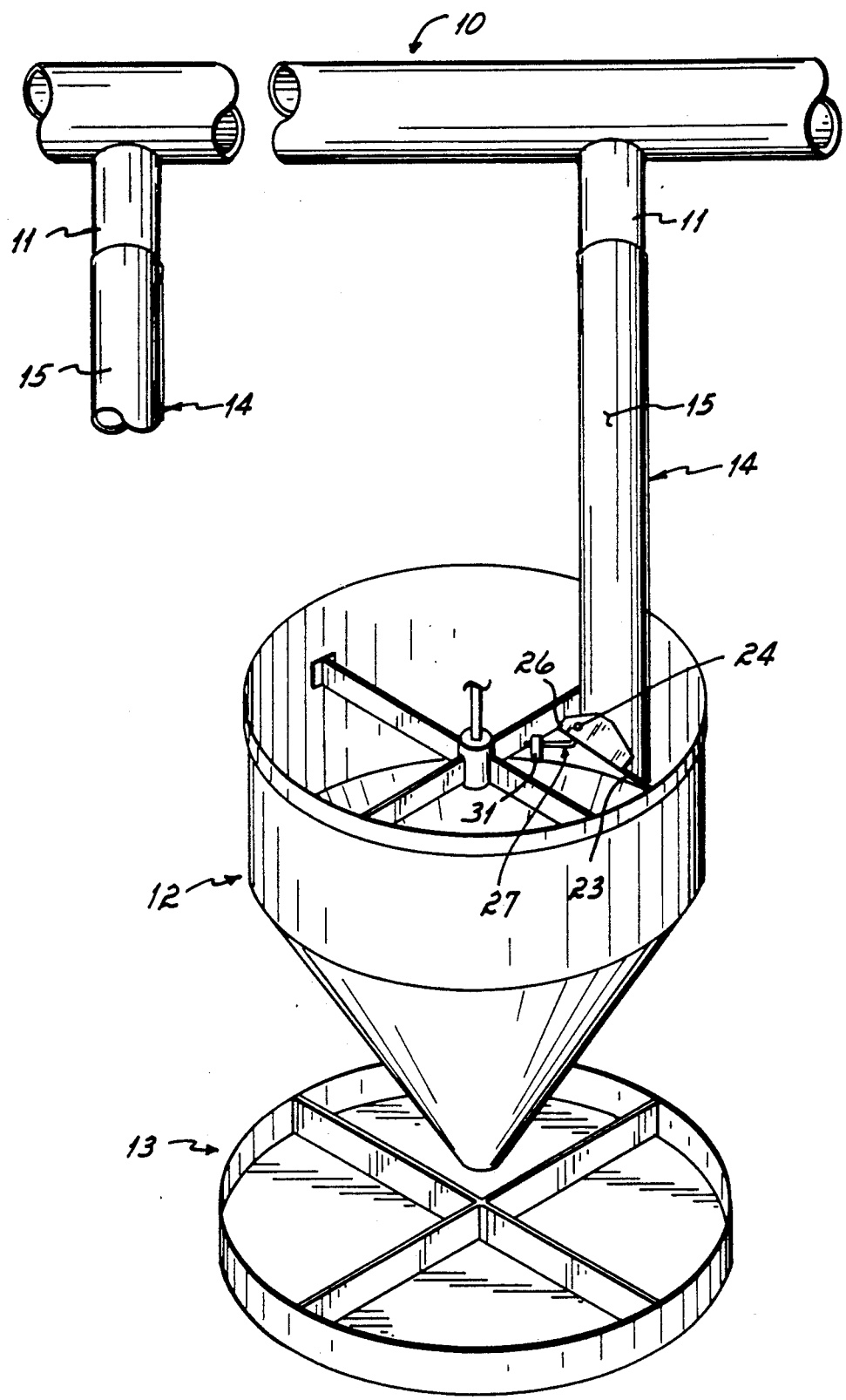
FIG. 1 is a partial perspective view of an animal feeding device utilizing a particulate material delivery device constructed in accordance with the present invention for supplying feed to an animal.

One system in which the present particulate material supply device may be employed advantageously is an animal feeding system of the type illustrated in FIG. 1. Such a system is adapted to provide feed to a number of farm animals such as hogs. The system includes a bin, or other source of particulate food (not shown). The bin is connected to a horizontal fill auger tube 10. Tube 10 is spaced several feet above floor level and is connected to a plurality of vertical tubes, two of which are shown at 11. These tubes convey feed from tube 10 to a plurality of feeders 12. It is to be understood that a typical feed system may include several horizontal auger tubes 10 and a large number of feeders.

The construction of feeders 12 constitutes no part of the present invention. Many types of feeders are in present day use and one suitable construction is disclosed in my pending patent application Ser. No. 838,663 for "Hog Feeder". As is well known to those skilled in the art, tube 10 houses an auger or feed screw which is rotated to move the feed along the horizontal tube 10 past the open upper ends of the vertical tubes 11. Feed drops through these tubes into the open top of feeders 12. In a typical installation, the distance which the feed is dropped is normally of the order of five to eight feet. The augers which convey the feed to the vertical tubes 11 are normally operated in an intermittent fashion, although the supply device of the present invention works equally well with constantly rotating augers. The feeders 12 are effective to dispense the feed supplied through vertical tubes 11 into suitable feed troughs or pans 13 which may be of any suitable construction.

The material supply device 14 of the present invention is mounted upon the lower end of vertical pipe tube 11 between that tube and feeder 12. The supply device 14 and tube 11 form a vertical conduit effective to supply material to feeder 12 in such a manner that the amount of dust released to the atmosphere is minimized.

More particularly, supply device 14 includes an outer tube 15 which surrounds the lower end of vertical tube 11. Tube 15 of the supply device 14 is mounted upon the lower end of tube 11 in any suitable manner such as by means of bolts, welding or the like. A cylindrical inner tube 16, concentric with outer tube 15, is disposed within the outer tube. A suitable clearance of, for example ⅜ths of an inch, is provided between the inner and outer tubes so that the inner tube is free to reciprocate vertically within the outer tube 15.

It will be appreciated that, in some cases, if material continues to be fed to tube 11, the weight of the column and weight of the counterweight will substantially balance one another so that the flap will be held partially open and the rate of material discharge will approximately match the rate at which material is fed to the tube. When material stops flowing into tube 11, the flap is closed.

The inner tube 16 carries in its upper portion a transverse rod 17 which is secured to the inner tube in any suitable manner. The rod 17 carries a coupling 18 which, in turn, supports a vertical rod 20. Vertical rod 20 includes an angulated section 21 formed on the lower end thereof. This section is pivotally connected as by means of a pin 22 to a closure flap 23 adapted to extend across and seal off the lower end of outer tube 15.

Figure 3:
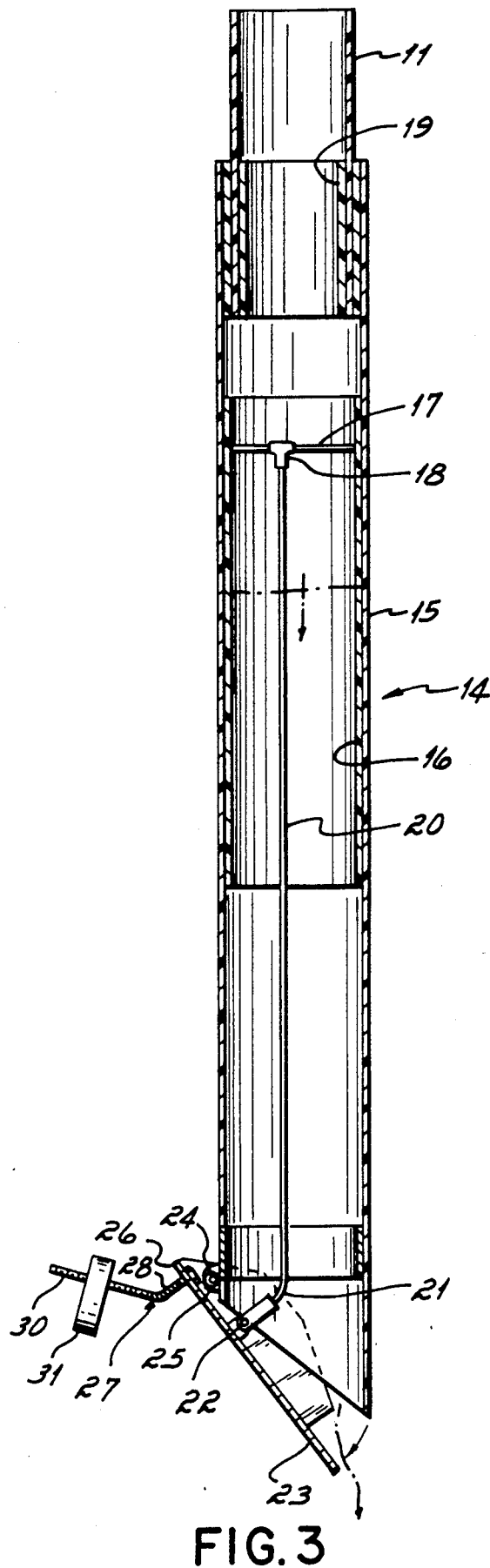
FIG. 3 is a vertical cross-sectional view similar to FIG. 2 showing the control flap in the open position.

As shown in FIG. 3, the lower end of tube 15 is open and is cut off at an angle to the vertical axis of tube 11. While this angle may vary in a preferred embodiment, the angle is 45° to vertical. Flap 23 is mounted upon a pivot pin 24 carried by a bracket 25 mounted on the outer lower surface of tube 15. It is to be understood, however, that pivot pin 24 can be disposed to the interior of tube 15 if desired. Flap 23 includes an outwardly extending section 26 which is disposed on the side of pivot pin 24 remote from tube 15. An angulated threaded rod 27 is secured to section 26. Threaded rod 27 includes a downwardly sloping section 28 and a horizontal section 30. A counterweight 31 is threadably mounted upon the rod in such a manner that it can be adjustably positioned inwardly and outwardly along section 30 to adjust the counterrotational torque applied to flap 23. The effect of counterweight 31 is to normally urge the closure flap 23 to its closed position. The flap is opened only when the weight of feed material within tubes 15 and 16 is sufficient to overcome the effect of the counterweight and cause the flap to pivot in a clockwise direction to an open position as illustrated in FIG. 3.

It will be appreciated that the diameter of outer pipe 15 will vary from installation to installation. However, I have found that in animal feeding systems of the type illustrated in FIG. 1, a diameter of from 3 to 6 inches is satisfactory and a preferable diameter is about 4 inches. It is contemplated that in industrial installations, supply devices of the present invention can utilize outer pipes as large as 24 inches in diameter. In such large installations it is considered preferable to use the modification of the supply device shown in FIG. 4.

As there shown, the modified supply device 40 includes a vertical tube 41 which corresponds to the vertical tube 11 shown in FIG. 1. In the embodiment shown in FIG. 4 there is no inner tube 15 utilized. The lower end of tube 41 is cut at an angle and is adapted to be selectively closed by a flap 42.

Flap 42 is pivotally mounted upon a pin 43 carried by a bracket 44 secured to the outer wall of tube 41. As explained previously, pivot pin 43 can be disposed within the confines of tube 41 if desired. Flap 42 includes as outwardly extending section 45 which is disposed on the side of pivot pin 43 remote from tube 41. This extension 45 carries a bracket 46 secured by means of pin 47 to the movable reciprocating element member 48 of a linear actuator 50. The details of construction of linear actuator 50 constitute no part of the present invention. Such actuators are well known to those skilled in the art. One suitable form of actuator is manufactured by Saginaw Steering Gear and is identified as a Hi-Tech 90 Plus PPA Performance Pack Linear Actuator.

Figure 4:
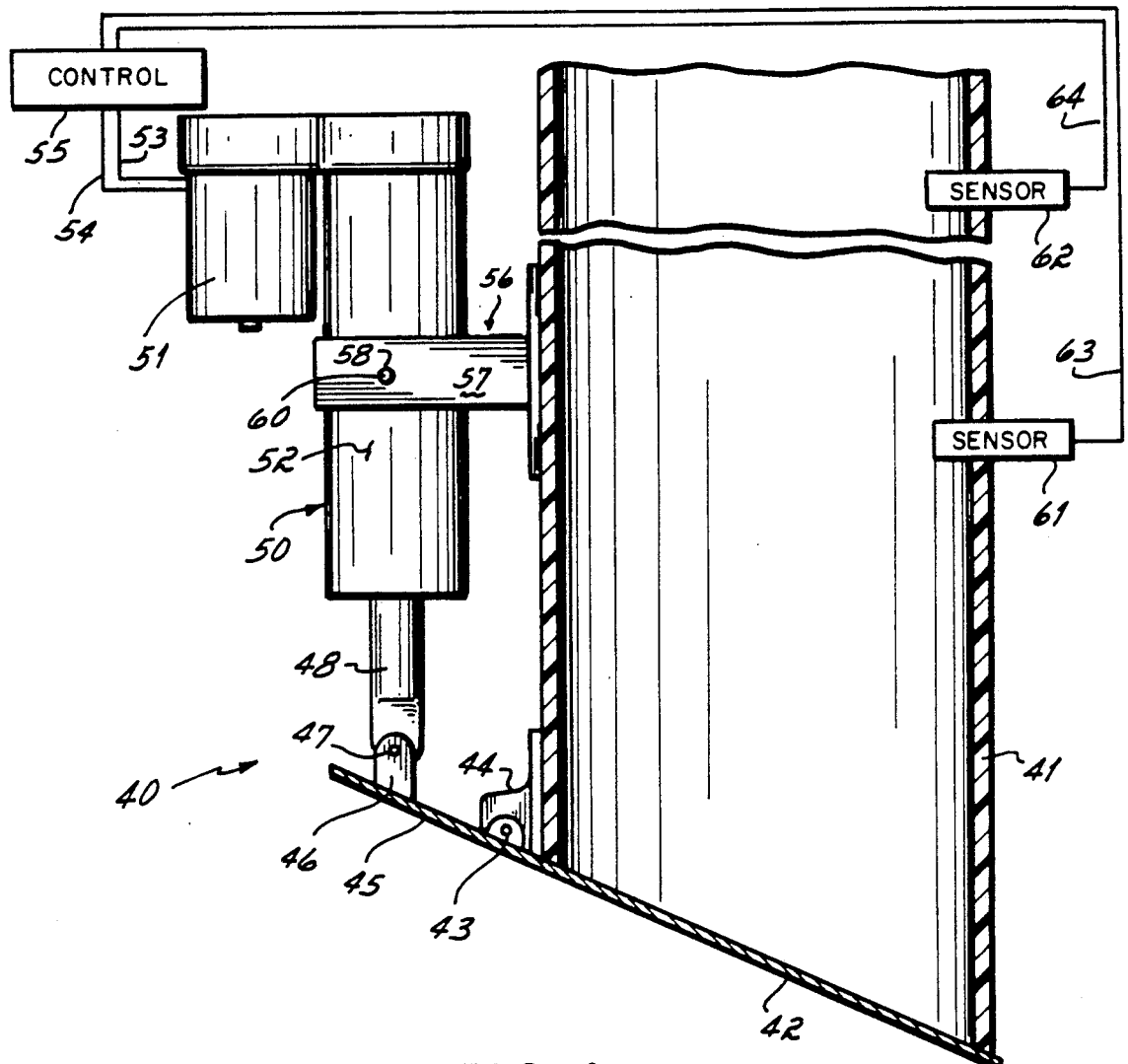
FIG. 4 is a semi-diagrammatic side elevational view of a modified form of particulate material supply device in which the position of the flap is controlled by a linear actuator.

Essentially, such an actuator includes a motor unit 51 which is connected by suitable gearing and a slip clutch to a ball screw assembly which reciprocates an inner tube mounted within housing 52. The inner tube carries member 48 and is effective to raise and lower that member in accordance with electrical signals applied to motor 51 through lines 53 and 54 constituting the output of a control unit 55. As shown in FIG. 4 linear actuator is mounted upon tube 41 by means of a trunion bracket 56 having two arms 57 disposed on opposite sides of housing 52. Arms 57 are provided with suitable openings 58 for receiving stub shafts 60 extending outwardly from the housing. Housing 52 is thus free to pivot about the stub shafts 60.

As shown in FIG. 4 the material supply device further comprises two sensors 61 and 62. These sensors extend through openings provided in the wall of tube 41 a short distance into the interior of the tube. The lower sensor 61 is disposed at the level at which it is desired to maintain the column of particulate material in tube 41, e.g., a foot above the lower end of the tube. Sensor 62 is disposed from several inches to several feet above the lower sensor. In a preferred embodiment sensors 61 and 62 are capacitive proximity sensors. Again, the details of construction of these sensors constitutes no part of the present invention. They each function to provide an output signal to their associated line 63 or 64 depending upon whether the level of feed is above or below the sensor. One suitable form of capacitive proximity sensor is manufactured by Omron and sold as their model RON E2K-C25ME1 sensor.

It will be appreciated that when the inner member of the linear actuator 50 is extended to the position shown in FIG. 4, flap 42 is caused to pivot counterclockwise to seal off the end of tube 41. When the inner member of the linear actuator is retracted upwardly, flap 42 is caused to pivot about pin 43 in a clockwise direction to open the lower end of tube 41 in a manner similar to that illustrated in FIG. 3.

Figure 2:
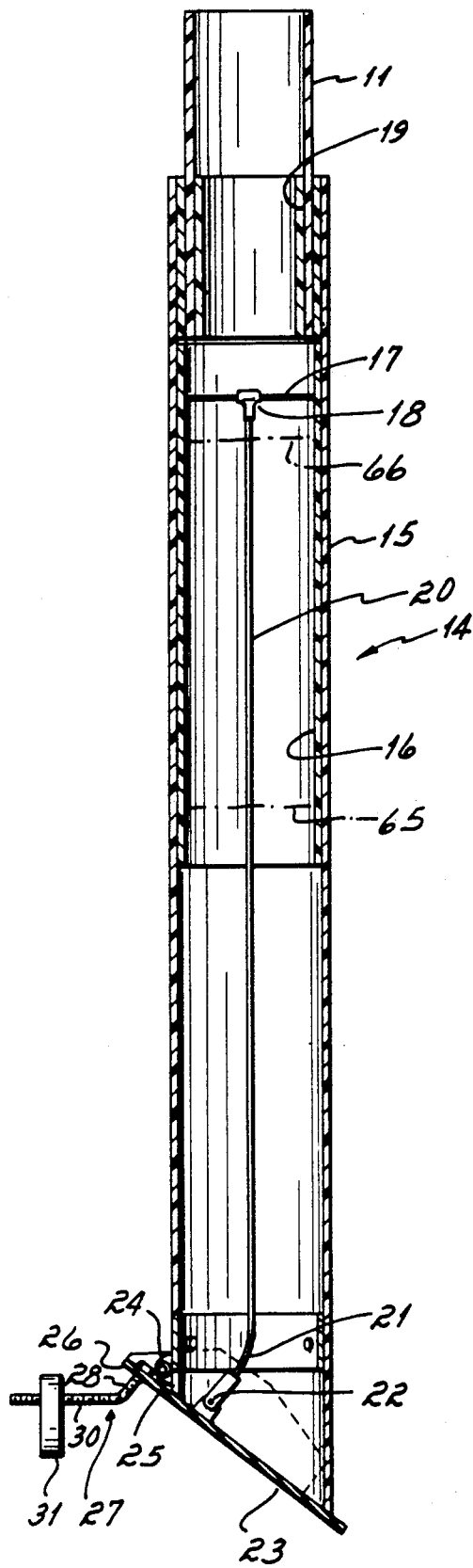
FIG. 2 is a vertical cross-sectional view through a particulate material delivery device of the present invention.

The operation of the system shown in FIGS. 1-3 is as follows: Assuming that the system is empty and no feed is in either auger tube 10 or vertical tube 11, the vertical tube 11 is closed by flap 23 since the flap is caused to rotate in a counterclockwise direction under the influence of counterweight 31. As the auger within the horizontal tube 10 supplies material to vertical tube the material drops to the bottom of the tube, but is prevented from being discharged from the tube by closure flap 23. As the material accumulates within the outer tube 15, it fills the lower portion of that tube and starts to rise within inner tube 16, for example, to the level 65 illustrated in FIG. 2. This weight of material is insufficient to overcome the effect of counterweight 31 so that closure flap 23 remains closed. All of the dust which is generated within the tubes 10 and 11 during the transport of the feed material is held within the vertical feed tube 11 and outer tube 15.

As the material continues to accumulate in the outer tube 15 and inner tube 16 its level rises to a line indicated by the numeral 66. At this point, the weight of material pressing against flap 23 and the weight of material pressing against the walls of inner cylinder 16 acts on the flap and inner cylinder which, in turn, acts on the flap through rod 20 to cause the flap to pivot in a clockwise direction against the effect of counterweight 31. This permits material to be discharged from tube 15. However, substantially no dust escapes from the lower end of the supply device 14 since the dust is trapped by a column of from one to two feet of solid particulate feed material. As the material is discharged the level of material drops, for example, until it again reaches the level 65. At this point, there is insufficient weight of material acting on inner cylinder 16 and flap 23 to overcome the effect of counterweight 31. The counterweight causes closure flap 23 to pivot counterclockwise and close off the discharge of material from supply device 14. Since there is still a buffer in the form of a column of particulate material disposed within the lower end of the supply device, dust is prevented from escaping into the atmosphere. Feed is prevented from entering the space between the inner and outer tubes by the constriction formed by sleeve 19. It should be pointed out that the lower end of the device is preferably spaced less than a foot from the level of material in feeder 12 so that no substantial amount of dust is created by the material dropping from the end of the supply device into the feeder.

The modified supply device of FIG. 4 functions in a manner similar to that of the device shown in FIGS. 1-3. More particularly, assuming that the system is empty and no feed is present in tube 41, flap 42 is closed as shown in FIG. 4. As feed is fed into tube 41, it accumulates above flap 42. When the feed reaches the level of sensor 62 a signal is sent through line 64 to cause linear actuator 50 to shift member 48 upwardly causing flap 42 to rotate in a clockwise direction, opening the lower end of tube 41 and permitting material to be discharged therefrom. When the level of material within the tube drops to the level of sensor 61 a signal is sent through line 63 to control unit 55. This causes the linear actuator to extend member 48 causing flap 42 to pivot in a counterclockwise direction, sealing off the end of tube 41. Thus, at all times the lower end of tube 41 contains a column of particulate material which prevents the escape of dust.

From the above disclosure of the general principles of the present invention and the above detailed description of two embodiments, those skilled in the art will readily comprehend various modifications to which the invention is susceptible. For example, the conduit formed by tube 11 and supply device 14 need not be disposed in a truly vertical direction. Instead, the conduit may be angulated from vertical so long as the conduit has a sufficient vertical component, i.e., a slope steep enough that the particulate material flows freely through the conduit under the effect of gravity. Accordingly, as used in the following claims, the term "vertical" is to be construed as being both absolutely vertical and angulated to vertical by an amount which still permits free flow of the material through the conduit.

Having described my invention, I claim:

1. A method of delivering particulate material from a vertical conduit into an open receptacle while reducing the amount of dust discharged into the atmosphere, which method comprises the steps of:
   closing the lower end of said vertical conduit;
   supplying particulate material to said vertical conduit;
   sensing the accumulation of particulate material in said vertical conduit;
   opening said lower end of said vertical conduit to allow said material to be discharged therefrom when a first predetermined quantity of said material accumulates in said conduit;
   sensing the material in said conduit and reclosing the lower end of said conduit when the quantity accumulated in said conduit drops to a second predetermined amount to maintain the lower end of said conduit filled with a quantity of particulate material effective to inhibit the escape of dust from said conduit.

2. The method of claim 1 in which the weight of material in said conduit is sensed.

3. The method of claim 1 in which the level of material in said conduit is sensed to determine said first and second quantities of accumulated material.

4. The method of claim 2 in which the weight of said material overcomes the force of a counterweight to displace a closure member to open the end of said conduit when the material reaches said first predetermined amount, said counterweight overcoming the weight of said material to displace said closure member to reclose said conduit when the amount of accumulated material drops to said second predetermined amount.

5. The method of claim 3 further comprising the steps of generating a first signal when the first predetermined amount of material is sensed, utilizing said signal to cause a closure member to be displaced to open said conduit, and generating a second signal when said level of material in said conduit drops to said second level and using said second signal to cause said closure member to be displaced to reclose said conduit.

6. A device for delivering particulate material from a vertical conduit into an open receptacle while reducing the amount of dust discharged into the atmosphere, said device comprising:
   a vertical conduit adapted to be mounted above said open receptacle;
   a movable closure member;
   first means mounting said movable closure member for pivotal movement adjacent to the end of said vertical conduit, said movable closure member being movable between a first position in which said closure member closes the end of said vertical conduit, and a second position in which said closure member is displaced form the end of said conduit to permit the flow of material therefrom;
   second means responsive to the amount of material disposed in the lower end of said conduit for causing said closure member to be shifted to said first position to close said conduit when the quantity of material drops below a predetermined limit and for shifting said closure member to said second position to permit material to be discharged from said vertical conduit when said material is above a predetermined limit;
   said second means comprising a linear actuator and means interconnecting said linear actuator to said movable closure member;
   said second means being effective to cause a predetermined amount of particulate material to be retained in the lower end of said conduit to inhibit the escape of dust from said conduit.

7. The device of claim 6 further comprising first and second sensors vertically spaced from one another for sensing the quantity of material in said vertical conduit and for controlling movements of said linear actuator.

8. A device for delivering particulate material from a vertical conduit into an open receptacle while reducing the amount of dust discharged into the atmosphere, said device comprising:
   a vertical conduit mounted above said open receptacle, said vertical conduit comprising an outer tube,
   an inner tube disposed for vertical movement within said outer tube;
   a movable closure member;
   first means mounting said movable closure member for pivotal movement adjacent to the end of said vertical conduit, said movable closure member being movable between a first position in which said closure member closes the end of said vertical conduit, and a second position in which said closure member is displaced from the end of said conduit to permit the flow of material therefrom;
   a counterweight interconnected to said closure member and normally urging said closure member toward said first position when the quantity of material within the lower end of said conduit drops below a predetermined limit;
   second means interconnecting said inner tube and said closure member for shifting said closure member to said second position to permit material to be discharged from said vertical conduit when said material is above a predetermined limit, said counterweight being effective to cause a predetermined amount of particulate material to be retained in the lower end to said conduit to inhibit the escape of dust from said conduit.

9. The device of claim 8 in which said second means comprises a rod interconnected to said inner tube and to said movable closure member.

10. The device of claim 9 in which said inner tube includes an upper portion and said rod is interconnected to the upper portion of said inner tube.

11. A system for delivering particulate material from a vertical conduit into an open receptacle while reducing the amount of dust discharged into the atmosphere, said system comprising:
an open receptacle;
a vertical conduit mounted above said open receptacle;
a movable closure member;
first means mounting said movable closure member for movement between a first position in which said closure member closes the end of said vertical conduit, and a second position in which said closure member is displaced from the end of said conduit to permit the flow of material therefrom;
second means responsive to the amount of material disposed in the lower end of said conduit for causing said closure member to be shifted to said first position to close said conduit when the quantity of material drops below a predetermined limit and for shifting said closure member to said second position to permit material to be discharged from said vertical conduit when said material is above a predetermined limit, said second means being effective to cause a predetermined amount of particulate material to be retained in the lower end of said conduit to inhibit the escape of dust from said conduit.

12. The device of claim 11 in which said movable closure member is mounted for pivotal movement adjacent to the end of said vertical conduit.

13. The device of claim 11 further comprising a counterweight normally urging said movable closure member toward said first position when said quantity of material drops below said predetermined limit.

14. The device of claim 13 in which said counterweight is adjustable.

15. The device of claim 12 in which the lower end of said vertical conduit forms an acute angle with the axis of said vertical tube.

* * * * *